United States Patent Office 3,592,671
Patented July 13, 1971

3,592,671
STABILIZATION OF CELLULOSE ESTER DOPES
Carl J. Malm and Walker F. Hunter, Rochester, N.Y., assignors to Eastman Kodak Company, Rochester, N.Y.
No Drawing. Continuation of application Ser. No. 725,958, May 1, 1968, which is a continuation of application Ser. No. 639,257, May 18, 1967, which in turn is a continuation-in-part of application Ser. No. 407,914, Oct. 30, 1964. This application Dec. 22, 1969, Ser. No. 882,786
Int. Cl. C08b 21/04, 21/06
U.S. Cl. 106—176
10 Claims

ABSTRACT OF THE DISCLOSURE

The use of a small amount of 1,2-propylene oxide in cellulose ester dopes has been found to result in the stabilization of such dopes to a significant degree against the formation of amber or brownish-red insoluble globules in the dope.

---

This application is a continuation of United States patent application Ser. No. 725,958, filed May 1, 1968 (now abandoned), which in turn was a continuation of United States patent application Ser. No. 639,257, filed May 18, 1967 (now abandoned), which in turn was a continuation-in-part of United States patent application Ser. No. 407,914, filed Oct. 30, 1964 (now abandoned).

The present invention relates to the stabilization by 1,2-propylene oxide of solutions of cellulose esters. In one of its more specific aspects, this invention relates to the stabilization by 1,2-propylene oxide of dopes formulated from the lower fatty acid esters of cellulose.

This invention will be described using cellulose triacetate in a methylene chloride solvent and cellulose acetone in an acetone solvent as specific embodiments thereof. However, it will be understood that the present invention encompasses solutions of cellulose esters in general in organic solvent containing methylene chloride and/or acetone, and includes lower fatty acid esters of cellulose, both simple and mixed, of which cellulose acetate and cellulose triacetate are examples. Cellulose esters of lower fatty acids (2-4 carbon acids) to which our invention is applicable also include cellulose acetate butyrate, cellulose acetate propionate, cellulose propionate, cellulose butyrate, and the like.

In the processes now being employed in the trade for making cellulose ester sheeting, flowable dopes are formulated by dissolving the cellulose ester in a suitable solvent and adding a plasticizer thereto. In some cases, as for instance in the preparation of filaments, plasticizer is omitted. Other additives such as pigments, etc. may be used as desired or required for the particular dope which is sought.

In the formulation of dopes (both plasticized and unplasticized) from cellulose acetate, a widely accepted organic solvent for cellulose acetate is acetone. Cellulose acetates readily dissolve in the acetone media. Methyl alcohol is often used to complete the cellulose acetate solvent system.

A suitable organic solvent for cellulose triacetate is one composed principally of methylene chloride. Other components, such as methyl alcohol with cyclohexane or butyl alcohol, may also be used with the methylene chloride in dissolving the cellulose triacetate. With cellulose acetates having degrees of substitution lower than about 2.6, generally relatively more acetone can be utilized in the solvent system to achieve the necessary complete dissolution of the cellulose acetate.

Since those ordinarily skilled in the preparation of cellulose ester dopes are well aware of the wide variation in types of organic solvents that can be utilized in the various dope formulations to achieve various desired effects, there is no need to describe in detail herein such organic solvents or the specific reasons for their presence in the various formulations. It is believed sufficient to point out that in all of the dope formulations to which the present invention relates, either a chlorinated hydrocarbon having a boiling point of at most about 100° C. (such as, for example, methylene chloride) or acetone (or a mixture of these materials) is present in the solvent portion of the cellulose ester dopes as a significant component (i.e., at least about 5 weight percent). However, considering only the solvent portion of the dopes of the invention, it is preferred that at least about 50 weight percent thereof be one (or a mixture) of these special solvents. The solvent portion of the celluose ester dope formulations of the present invention generally constitutes from about 65 weight percent to about 95 weight percent of the total formulation, and preferably comprises from about 75 to about 85 weight percent thereof. The remainder of the dope formulation consists of materials that are essentially non-volatile at 105° C., such as the cellulose esters, plasticizers, pigments, dyes, various stabilizers selected to improve the aging characteristics of the solid cellulose ester coating compositions after the solvents have been evaporated, as well as other non-volatile materials.

Components of cellulose ester dope systems may tend to undergo hydrolysis in the dope system with the resulting formation of minute quantities of acidic substances. For instance, acidic substances may form, and chloride and acetate ions may be liberated, for example, in cellulose ester dopes containing methylene chloride and cellulose acetate. The acid substances thus produced tend to slowly corrode metal pumps and the stainless steel of valves, hoppers or spinnerets, and related equipment used in the dope system.

The corrosion of the equipment used in the dope system may necessitate frequent overhauling and cleaning operations.

The iron compounds formed as a consequence of the decomposition of cellulose ester dopes can catalyze the deacetylation of a cellulose ester and result in the formation of globules of dope inside the stainless steel hopper lips in typical coating operations. These globules of an amber or brownish-red color may not be soluble in the normal dope solvents. Some of these insoluble globules have been identified as composed of deacetylated cellulose ester.

These amber specks or insoluble globules may be prone to work their way into the cellulose ester products being formed, thus affecting the quality of such products. For instance, if a cellulose ester film support is being produced, the specks may appear as coating lines in the support itself. As another example, if the dope is used in making filaments for textile purposes, the undesirable material may show up as imperfections in the yarn.

One object of our invention is the stabilization of cellulose ester dopes. Another object of our invention is the prevention of corrosion of iron and stainless steel equipment which make up the dope system. Still another object of our invention is the elimination of the deacetylation of cellulose esters in solutions thereof. Other objects of our invention will appear herein.

We have discovered that if an effective amount of 1,2-propylene oxide is added to the cellulose ester dope formulation, the tendency of any of the constituents of said dope formulation to hydrolyze into acidic material is inhibited. Without the formation of acid, or by counteracting its effect, corrosion of iron and steel equipment used in the dope system will not occur. Without corrosion, iron salts which tend to catalyze deacetylation of the cellulose ester do not form.

The 1,2-propylene oxide appears to act as an acid acceptor in the system, thereby counteracting the effect of acid which may form as a result of partial hydrolysis of the ingredients of the cellulose ester dope. Such counteraction may be shown as:

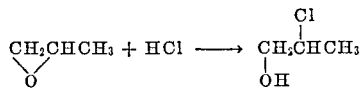

or

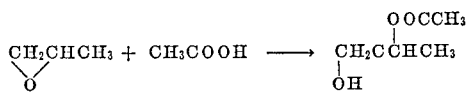

We have found that the operable amount of 1,2-propylene oxide to achieve the desired result lies within the range of .002 to 3.0 percent, based on the weight of the cellulose ester dope. The preferred range employed in most cases is from .01 to 1.0 percent 1,2-propylene oxide.

The liquid 1,2-propylene oxide is conveniently added to the cellulose ester dope while such dope is in its processing system. However, the addition of the 1,2-propylene oxide directly to the cellulose ester solvent prior to its incorporation into a cellulose ester dope is not precluded from our invention.

The following specific examples will serve to more fully explain our invention. However, it will be understood that these are only examples and in no way limiting of the invention.

EXAMPLE 1

Two solutions of recovered film scrap (essentially 87% cellulose triacetate of 43.4% acetyl content, 8.5% triphenyl phosphate, and 4.5% dimethoxy ethyl phthalate) were made by dissolving the scrap film in a solvent mixture consisting of 90% methylene chloride and 10% of a mixture of equal parts of methyl alcohol and butyl alcohol to make a clear viscous solution. 1,2-propylene oxide (0.1% based on the weight of the solution) was added to one of the solutions.

Specifically prepared corrosion test strips of steel were partially immersed in each solution. After holding these solutions for seven days at 205° F. in an autoclave, the test strip in the solution without 1,2-propylene oxide showed a reddish gelatinous material adhering to the steel strip surface which was insoluble in the methylene chloride-alcohol solution. When the steel test strip which had been placed in the dope without 1,2-propylene oxide was thoroughly cleaned, it showed a severe surface etch and a weight loss of 51.2 milligrams per square decimeter.

The solution containing 1,2-propylene oxide did not contain any color or gelatinous material adhering to the surface of the steel strip. The steel specimen did not show a change in surface, and the weight loss was no more than 1.7 milligrams per square decimeter.

EXAMPLE 2

Two solutions of cellulose triacetate of 43.4% acetyl content were made by dissolving the cellulose triacetate in a solvent mixture consisting of 84% methylene chloride and 16% of equal parts of methyl alcohol and cyclohexane. Fifteen percent (based on the weight of the cellulose triacetate) of triphenyl phosphate was added to these solutions. 1,2-propylene oxide (0.1% based on the weight of the solution) was added to one of the solutions.

Specially prepared corrosion test strips of steel were partially immersed in each solution. After holding the strips in these solutions for seven days at 205° F. in an autoclave, the test strip in the solution without 1,2-propylene oxide was found to have an adhering reddish-yellow gelatinous material which was insoluble in the solvent used in dissolving the cellulose triacetate. When this steel test strip was thoroughly cleaned, it showed severe surface "pitting" and a weight lose of 74.5 milligrams per square decimeter.

The solution containing 1,2-propylene oxide did not contain any color or gelatinous material adhering to the steel strip surface. This steel strip did not show a change in surface, and the weight loss was no more than 3.1 milligrams per square decimeter.

EXAMPLE 3

Two solutions of hydrolyzed cellulose acetate of 39.8% acetyl content were made by dissolving the cellulose acetate in a solvent mixture consisting of 85% acetone and 15% methyl alcohol. Fifteen percent (based on the weight of the cellulose acetate) of diethyl phthalate was added to these solutions. 1,2-propylene oxide (1.0% based on the weight of the solution) was added to one of the solutions.

Specially prepared corrosion test strips of steel were partially immersed in each solution. After holding the strips in these solutions for seven days at 205° F. in an autoclave, the test strip in the solution without 1,2-propylene oxide showed a colored gelatinous material adhering to the test strip which was insoluble in the acetone-methyl alcohol solvent. The steel test strip after cleaning showed a severe surface "pitting" and a weight loss of 1.77 milligrams per square decimeter.

The solution containing 1,2-propylene oxide showed no color or adhering insoluble material. This steel test strip after cleaning showed no change in surface characteristics and exhibited a weight loss of no more than .59 milligram per square decimeter.

The solutions containing 1,2-propylene oxide from each of the examples were employed in coating out film base or sheeting by conventional procedure from a hopper onto a film-forming surface. No formation of defects, as might result from the presence of insoluble globules, was observed. The sheeting obtained in each case was of good clarity and free of any discoloration, as might be encountered from the presence of iron salts in the coating dope.

If the solvent recovery process used in recovering the spent solvent does not remove all of the 1,2-propylene oxide from the dope system, traces of 1,2-propylene oxide might be present ultimately in the cellulose ester product made from dope formulas which contain 1,2-propylene oxide as a stabilizer. However, tests show that the presence therein of residual 1,2-propylene oxide has no detrimental effect on such product.

Although our invention has been described in considerable detail with reference to certain preferred embodiments thereof, it will be understood that variations and modifications can be effected within the spirit and scope of the invention as described hereinabove and as defined in the appended claims.

We claim:

1. A stabilized cellulose ester dope comprised of a lower fatty acid ester of cellulose dissolved in a solvent medium containing from about 0.002 to about 3 weight percent, based on the total weight of said cellulose ester dope, of 1,2-propylene oxide; said solvent medium consisting essentially of organic solvents and constituting between about 65 and about 95 weight percent of said dope, and at least about 50 weight percent of said solvent medium being at least one chlorinated hydrocarbon having a boiling point below about 100° C.

2. A stabilized cellulose ester dope as in claim 1, wherein said chlorinated hydrocarbon is methylene chloride.

3. A stabilized cellulose ester dope as in claim 2, wherein said solvent medium contains an amount of 1,2-propylene oxide within the range of from about 0.01 and about 0.1%, based on the total weight of said cellulose ester dope.

4. A stabilized cellulose ester dope as in claim 3, wherein the amount of said solvent medium in said dope is between about 75 and about 85 weight percent.

5. A stabilized cellulose ester dope as in claim 4, wherein said cellulose ester is cellulose acetate.

6. A stabilized cellulose ester dope as in claim 4, wherein said cellulose ester is cellulose acetate butyrate.

7. A cellulose ester dope as in claim 4, wherein said cellulose ester is cellulose propionate.

8. A cellulose ester dope as in claim 4, wherein said cellulose ester is cellulose butyrate.

9. A cellulose ester dope, wherein the nonvolatile portion of said dope is comprised of about 87 weight percent cellulose triacetate, about 8.5 weight percent triphenylphosphate, and about 4.5 weight percent dimethoxy ethyl phthalate, and said solvent medium consists of about 90 weight percent methylene chloride and about 10 weight percent of a mixture of approximately equal parts of methyl alcohol and butyl alcohol; the amount of 1,2-propylene oxide in said dope is about 0.1 weight percent.

10. A cellulose ester dope, wherein the nonvolatile portion of said dope consists essentially of cellulose triacetate plasticized with about 15% triphenyl phosphate, based on the weight of said cellulose triacetate and said solvent medium consists essentially of about 84 weight percent of methylene chloride and about 16% of approximately equal parts of methyl alcohol and cyclohexane; the amount of 1,2-propylene oxide in said dope being about 0.1 percent, based on the total weight of said dope.

References Cited
UNITED STATES PATENTS

| | | | |
|---|---|---|---|
| 2,719,089 | 9/1955 | Lovell | 106—176 |
| 2,761,788 | 9/1956 | Lowe | 106—176 |

MORRIS LIEBMAN, Primary Examiner

H. H. FLETCHER, Assistant Examiner

U.S. Cl. X.R.

106—177, 179, 181, 189, 190, 191, 196